(12) United States Patent
Bauer et al.

(10) Patent No.: US 10,229,575 B2
(45) Date of Patent: Mar. 12, 2019

(54) UNIVERSAL PERSONAL EMERGENCY INFORMATION NOTIFICATION AND REPORTING SYSTEM AND METHOD

(71) Applicant: Sparq, LLC, Denver, CO (US)

(72) Inventors: Timothy Bauer, Denver, CO (US); Andrew Perry, Denver, CO (US); Bijumon Thomas, Denver, CO (US)

(73) Assignee: Sparq, LLC, Denver, CO (US)

( * ) Notice: Subject to any disclaimer, the term of this patent is extended or adjusted under 35 U.S.C. 154(b) by 91 days.

(21) Appl. No.: 15/530,682

(22) Filed: Sep. 23, 2015

(65) Prior Publication Data

US 2018/0012471 A1 Jan. 11, 2018

Related U.S. Application Data

(60) Provisional application No. 62/053,897, filed on Sep. 23, 2014.

(51) Int. Cl.
| | |
|---|---|
| *G08B 21/02* | (2006.01) |
| *H04Q 9/00* | (2006.01) |
| *H04W 4/02* | (2018.01) |
| *G08B 25/01* | (2006.01) |
| *G08B 25/10* | (2006.01) |
| *H04L 29/08* | (2006.01) |

(52) U.S. Cl.
CPC ..... *G08B 21/0277* (2013.01); *G08B 21/0269* (2013.01); *G08B 25/016* (2013.01); *G08B 25/10* (2013.01); *H04L 67/1097* (2013.01); *H04Q 9/00* (2013.01); *H04W 4/02* (2013.01); *H04Q 2209/43* (2013.01); *H04Q 2209/823* (2013.01)

(58) Field of Classification Search
CPC ............ G08B 21/0277; G08B 21/0269; H04L 67/1097; H04Q 9/00; H04Q 2209/43; H04Q 2209/823
See application file for complete search history.

(56) References Cited

U.S. PATENT DOCUMENTS

| 7,907,931 B2 | 3/2011 | Hartigan et al. |
| 9,547,972 B2 * | 1/2017 | Castillo ............. G08B 21/0453 |

(Continued)

OTHER PUBLICATIONS

Silincode—QR Solutions [online]. Silincode, 2015 [retrieved on Dec. 22, 2015]. Retrieved from the internet: <URL:www.silincode.com (Spain)—Translation Provided See Attachment.

(Continued)

*Primary Examiner* — Mohamed Barakat
(74) *Attorney, Agent, or Firm* — Rocky Mountain Patent, LLC.

(57) ABSTRACT

An apparatus, system and method surrounding the sensing, recording and communicating information pertaining to users providing a portable identification and diagnostic reporting system configured with data storage, sensors, processing, and transmission means to notify intended recipients of identification, sensed, collected and prewritten user data. Communication of such data, stored on local devices and/or cloud based storage, and executed through means such as UHF, nearfield and other wireless communication protocols. The apparatus, system and method are intended for use in scenarios including but not limited to social, medical and emergency applications.

11 Claims, 10 Drawing Sheets

(56) References Cited

U.S. PATENT DOCUMENTS

| | | | | |
|---|---|---|---|---|
| 2014/0017999 A1* | 1/2014 | Brabenac | ............... | H04W 4/80 |
| | | | | 455/41.1 |
| 2014/0247150 A1* | 9/2014 | Proud | .................... | H02J 7/025 |
| | | | | 340/870.02 |
| 2015/0125832 A1* | 5/2015 | Tran | .................. | G09B 19/0092 |
| | | | | 434/127 |

OTHER PUBLICATIONS

Leveraging RFID in hospitals: Patient life cycle and mobility perspective: Abstract Authors: Cangialosi, A.; Monaly, JE; Yang, S.C. Communications Magazine, IEEE (vol. 45 , Issue: 9 ) See Attachment.

RFID-based Hospital Real-time Patient Management System: Abstract Authors: Chowdury, B.; Khosla, R. Computer and Information Science, 2007. ICIS 2007. 6th IEEE/ACIS International Conference (Jul. 11-13, 2007) See Attachment.

Minimization of patient misidentification through proximity-based medical record retrieval: Abstract Authors: Natarajan, S.; Wottowa, C.R.; Dutson, E.P. Complex Medical Engineering, 2009. CME. ICME International Conference (Apr. 9-11, 2009) See Attachment Positive Patent Identification using RFID and Wireless Networks Authors: Aguilar, Antonio; Van Der Putten, Wil; Maguire, Gerald See Attachment.

\* cited by examiner

UNIVERSAL PERSONAL EMERGENCY INFORMATION NOTIFICATION AND REPORTING SYSTEM AND METHOD

CROSS REFERENCE TO RELATED APPLICATIONS

This application claims the benefit of U.S. Provisional Application 62/053,987 titled "Universal Personal Emergency Information Notification And Reporting System And Method" filed Sep. 23, 2014. The entire disclosures of the above-referenced applications are incorporated herein by reference in entirety for all purposes.

FIELD OF THE INVENTION

The invention relates to wearable wireless communication devices and methods of utilizing such devices.

BACKGROUND OF THE INVENTION

Every day millions of people engage in activities where their bodies are exposed to risks of varying intensity and cause, either external or due to underlying medical conditions. These risks may limit one's ability or desire to perform tasks such as those related to common everyday living, occupational functions or for the purposes of recreation.

It is generally recognized that in cases of a medical emergency those with an underlying medical conditions often wear or carry medical identification jewelry or information cards to facilitate medical care in the case of medical emergency or other events. Such devices are useful for the purposes of providing valuable information about the wearer in case of an event that would require medical attention. However such solutions are merely an informational queue for persons attempting to assist the wearer such as a first-responder, emergency medical technician, paramedic or simply a member of the general public acting in the capacity of a Good Samaritan. Furthermore, the amount of information such devices may hold, often in a non-digital, human-observable form, is limited by the small form-factor.

Other devices available in the prior art surrounding the addressing of medical response needs are available in the form of a help-call button mounted at strategic points within a facility or home. Alternatively, such devices may be worn and activated by the user or other persons assisting the wearer in order to summon emergency medical service personnel. The problem with such solutions stem from the need for activation that may occur following an event which prevents the user from being able to perform such actions. Furthermore, although previous medical information may be available, actionable data pertaining to the current event is unavailable to provide summoned medical personnel. Further still, such permit little mobility in the sense that the help-call buttons are typically hard wired or, in the case of the user-worn variety, offer a limited range of communication and functionality.

There are several commercially available medical data storage applications that are configured as jewelry or clothing elements and allow a wearer or emergency responders to access medical records stored within said applications. Additionally, there are several applications configured to allow a wearer to signal the location, document presence, or proximity within or outside of a facility to the monitoring personnel or emergency responders and summon assistance. However, there is a lack of a practical application configured with sensors and reporting means to alert the wearer, monitors or the emergency responders of a sensor-detected condition exceeding a predetermined threshold and predicted to present a medically urgent condition, location or movement and further configured to communicate the wearer data and information to the emergency responders or monitors.

Other devices in the prior art surrounding the need for notification to family members, caretakers, and other intended recipients in the case of need for assistance such as in an emergency permit a nearly unlimited range by providing communication to a centralized service by means of satellite communication. These devices, however, provide a user a limited selection of communication options stemming from a series of pre-written messages by the user to be sent when the user actuates one of a series of buttons. Furthermore, some devices known in the prior art also require a substantially clear view of the sky or access to sophisticated or proprietary data networks, limiting the application of such a device to outdoors and away from large structures.

SUMMARY OF THE INVENTION

Certain embodiments of the invention include an apparatus, system and method surrounding the sensing, recording and communicating information pertaining to users. Certain embodiments of the invention include a method of using such apparatus to create a portable identification and diagnostic reporting system configured with data storage, sensors, processing, and transmission means to notify intended recipients of identification, sensed, collected and prewritten user data. Generally, certain embodiments of the invention include a system and method implemented in situations where an individual or a plurality of users of an identification and data storage device discussed herein, recognize the value of the transmission of sensed and prerecorded information or collected data to recipients.

Certain embodiments are intended as an identification device providing a way to store and record user data, detection of a physiological event, a way to alert the user of event occurrence, and/or a way of communication of an event occurrence and wearer's data to a communication device, such as a mobile telephone, to enable communication of collected and stored data to intended recipients.

Furthermore, embodiments of the invention are configured to employ direct-to-mobile communications devices to report the user's data, proximity, location, and more specifically to store and transmit the data and alert local area recipients/responders of useful personal information or access to important health or contact information in the case of an emergency, or in the case of, for example, other adverse biometric, climatic, atmospheric or battlefield conditions as intended by the user.

DETAILED DESCRIPTION OF CERTAIN EMBODIMENTS

Definitions

MEMS—micro-electric mechanical system.
EEPROM—electrically erasable programmable read-only memory.
UHF—ultra high frequency radio (including BLE (Bluetooth Low Energy (Bluetooth™ 4.0))
SRC—Short-range communication
NFC—Near Field Communication
RF—radiofrequency
Cloud Computing—using multiple server computers via a digital network, as though they were one computer.

Figure 6A:
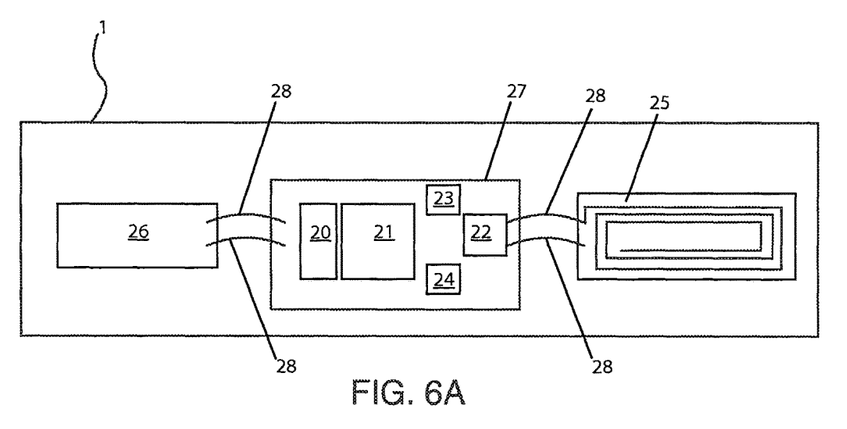
FIG. 6A. Diagram of an embodiment of an outward-facing side of circuitry of an identification device.
Figure 6B:
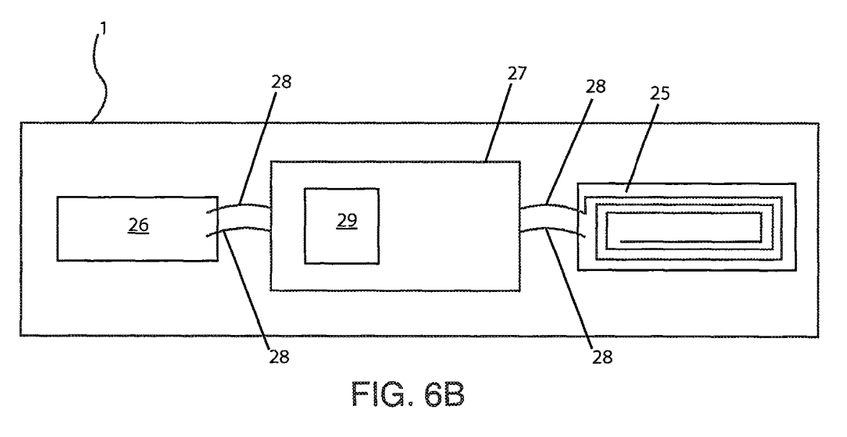
FIG. 6B. Diagram of an embodiment of an inward-facing side of circuitry of an identification device.

A device embodying the inventive principles of the invention, as shown in FIG. 6A and FIG. 6B includes a power supply 26, at least one sensor 23 such as an accelerometer, an input 24 such as a button, a processing unit, memory storage 29 such as flash or EEPROM, and communication means including RF transmitter and receiver such as an NFC antenna 25 connected to a NFC radio 22 (allowing NFC communication) and a UHF antenna 20 (e.g. BLE antenna) connected to a UHF radio 21 (e.g. Micro or BLE radio). In certain embodiments, components such as an input 24, NFC radio 22, sensor 23, UHF radio 21, and UHF antenna 20, are located on an outward facing surface of a circuit board 27 of an ID 1, as shown in FIG. 6A. In certain embodiments, components such as a memory storage 29 are located on an inward facing surface of such circuit board 27 of an ID 1, as shown in FIG. 6B. In certain embodiments, an NFC antenna 25 is located outside of a circuit board, further connected to an NFC radio 22 by wire 28, as shown in FIG. 6A. Such placement of an antenna 25 lessens potential interference of signals transmitted to and from such antenna 25 with other portions of an ID 1. Referring to FIG. 6A and FIG. 6B, in certain embodiments, a power supply 26 is located outside of a circuit board, connected to a circuit board 27 by wire 28. Certain embodiments solve the problems surrounding providing identification and actionable data to intended recipients who intend to provide assistance to the user of said device. Such device records at least information set relevant to the user and saves it to memory storage 29. Sets of information include but are not limited to user's physiological and environmental information such as body temperature, heart rate, blood pressure, hydration state and perspiration. Using a processing unit, at a predetermined event indicated directly by said information sets or the analysis thereof, the device utilizes the communication means to log an event or otherwise contact a remote recipient. A recipient or plurality of recipient, includes but is not limited to monitors, emergency medical service providers, family members, medical care providers, co-workers or anybody present to provide assistance to the user as necessary. Furthermore, the user may initiate the communication of said information sets manually if it is so desired. Further still, the device may be configured to allow the constant streaming of information sets or permit the request for data by a pre-approved entity such as a user's primary care physician designated guardian, or monitor.

Figure 2:
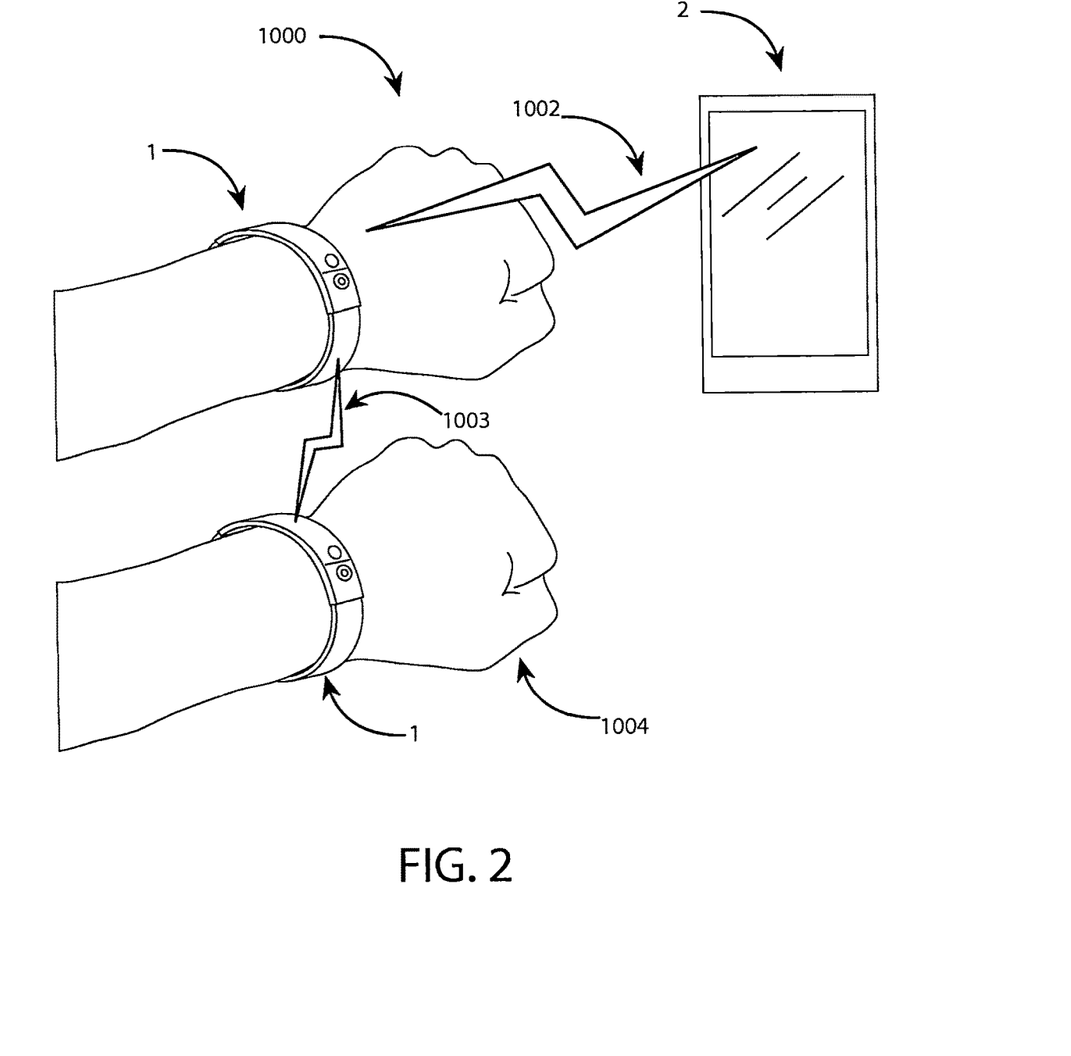
FIG. 2. Embodiment of an identification device on a wrist communicating with a long range communications device.

In certain embodiments of the invention, as shown in FIG. 2, a identification device 1 ("ID") is configured as a wearable device or wearable article such as a piece of jewelry (bracelet, anklet, armband, necklace) or article of clothing, worn by a wearer 1000. Such ID 1 includes of a power source, a control means, a microprocessor, memory storage, one or more sensing modules, and a means for short-range communication, herein referred to as an SRC, a transceiver, and an interface means. Furthermore, ID 1 is communicatively configured via the SRC with a long range communication device, also referred to as an LRC. An LRC includes any number of communication devices, for example, a smartphone 2 or tablet, with internet, cellular, or satellite communication connectivity capable of receiving and transmitting information through long range communication protocols including but not limited to cellular network, WiFi internet protocol, satellite communications, and radio. In one example, as shown in FIG. 2, an ID 1 transmits information 1002 to and from a smartphone 2 such information transmitted over UHF such as a BLE protocol. Still referring to FIG. 2, in another example, an ID 1 of one user 1000 transmits information 1003 to and from an ID 1 of a second user 1004, such information transmitted over a NFC protocol.

Figure 1A:
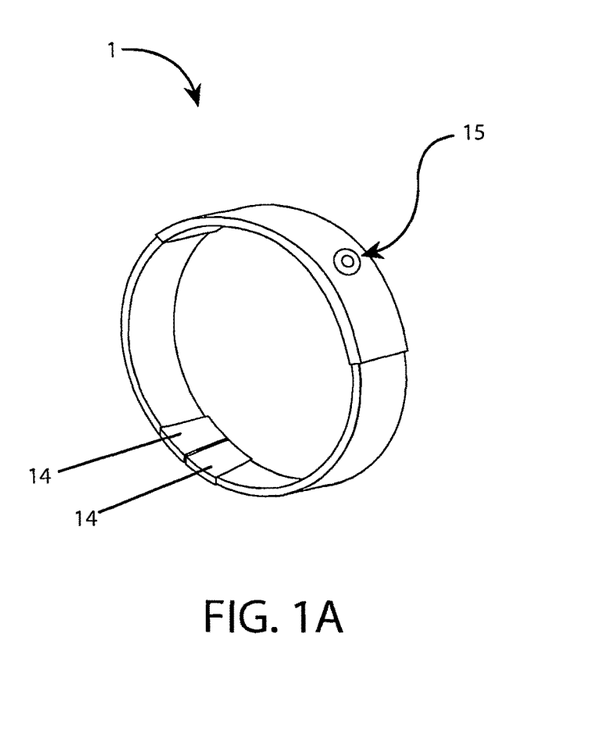
FIG. 1A. Embodiment of an identification device.

In an embodiment of the invention, the ID 1 includes a wrist worn device with a sensor array, power supply, signal processing unit, memory and an SRC module. It will be appreciated by one skilled in the art that power supply refers to a source of electrical power, such as a battery or a capacitor. Such power source configuration allows the embodiment to be replaced or recharged as necessary through traditional or energy harvesting technology. In certain embodiments, an ID 1 further includes a clasp 14, as shown in FIG. 1A, appreciated by those skilled in the art, to accomplish fastening to the wearer's wrist or other clothing or accessories worn by a wearer, as shown in FIG. 2.

LRC is configured as a communication device operating with a software application to process signal communications from the ID, and capable of receiving and/or transmitting RF and other wireless communications (E.g. WiFi, Bluetooth®, Bluetooth Low Energy® or other Low Energy technology transmitter such as ANT+® or Zigbee®, 2-way NFC) in the frequency range of the short-range wireless communication device or module, and capable of wired or wireless long-range communications in a manner that allows for communicating with monitors, emergency responders or computer networks. The LRC, in certain embodiments, is one of a number of devices including but not limited to a Bluetooth enabled cellular telephone, tablet or a portable satellite telephone, capable of data transmission to recipients.

In certain embodiments the LRC utilizes group tracking and communication and reporting system such as U.S. Pat. No. 8,860,570 entitled a "Portable wireless personal head impact reporting system" to Thomas, et al., the entire contents of which are incorporated by reference. It will be appreciated by those skilled in the art that a short range communication device is a unit utilizing communication protocols including but not limited to UHF, nearfield, Bluetooth, WiFi and other commonly used communication protocols.

In such embodiment, the ID 1 is paired with a specific LRC device, in one embodiment as the cellular telephone of the user, user's spouse or a parent if the user of the ID is a child. In an embodiment of the invention, the pairing of the ID to an LRC is enabled such that if it is desired, the users may pair a plurality of ID devices to a singular LRC device, a singular ID to a plurality of LRC or a plurality of ID devices to a plurality of LRCs. In certain embodiments, pairing of an ID 1 to an LRC 2 is activated by pressing a button and activating an input, for example, for a certain number of seconds. In an embodiment, pressing a button, and activating an input for three seconds pairs an ID to an LRC. When communication is initiated, the ID transmits the information to an LRC, which is then transmitted to an external system. The external systems include but are not to limited remote information, monitoring and communications centers, 3rd party EMS services, medical care providers such as a primary care physician and rescue workers.

Figure 4:
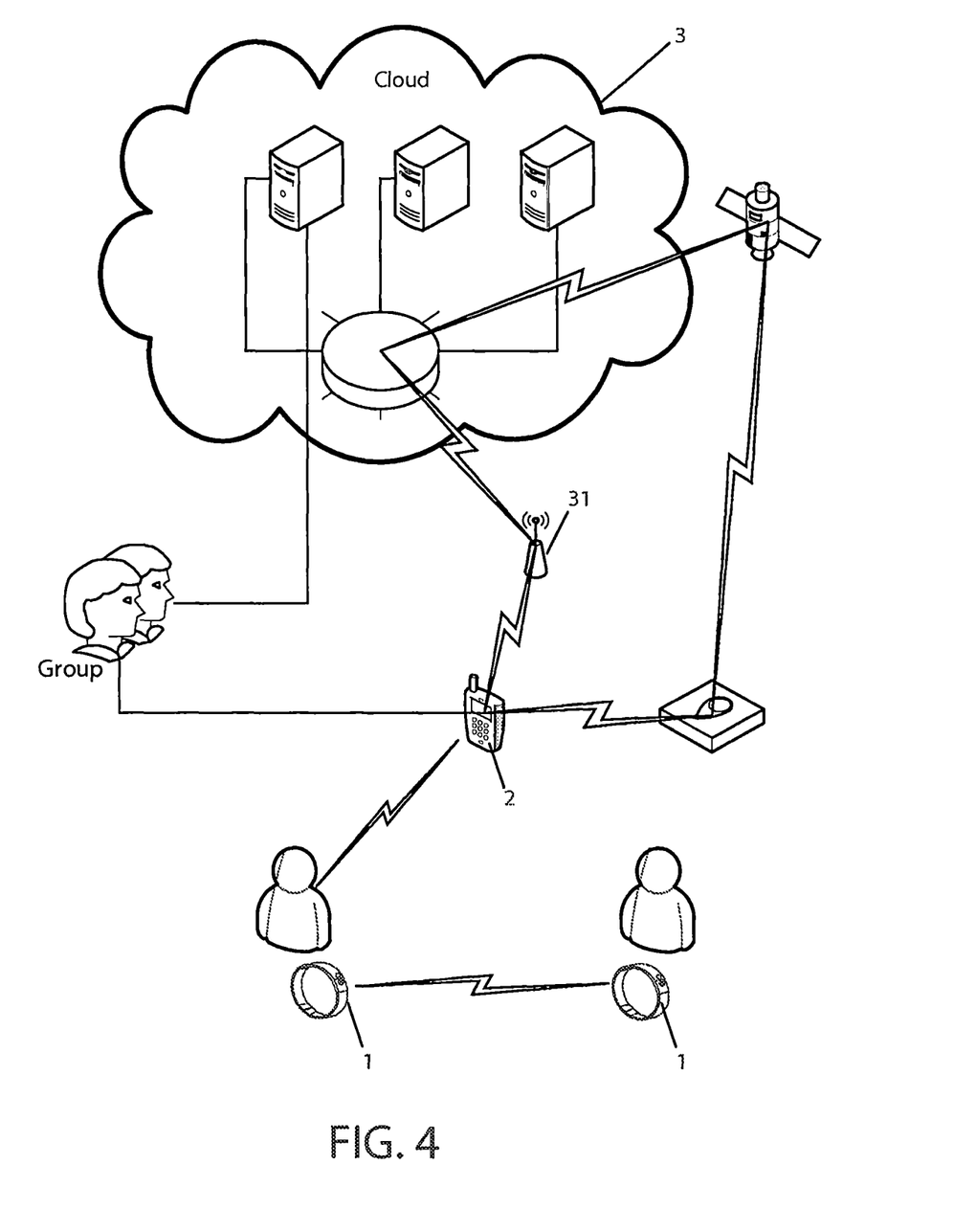
FIG. 4. Diagram of an embodiment of a communication system related to an identification device.

Referring to an example shown in FIG. 4, a remote information and communications center 3, cloud, is a networked data center capable of receiving communications from an LRC 2 and processing the data to determine the nature of the event occurrence. Such data on a cloud 3 is accessible through an LRC 2 or an ID 1. Furthermore, an LRC 2 is capable of data storage, including wearer's medical records and personal information, and based on the data contained in the event occurrence communication configured to select an optimal EMS such as but not limited to medical services, police and/or fire response. Optimal EMS is selected with reference to geographic proximity to the wearer 1000 and capable of responding to the specific type of event occurrence as detected by a sensor 23 such as an accelerometer, or an input 24 such as a press of a button 15.

Figure 1B:
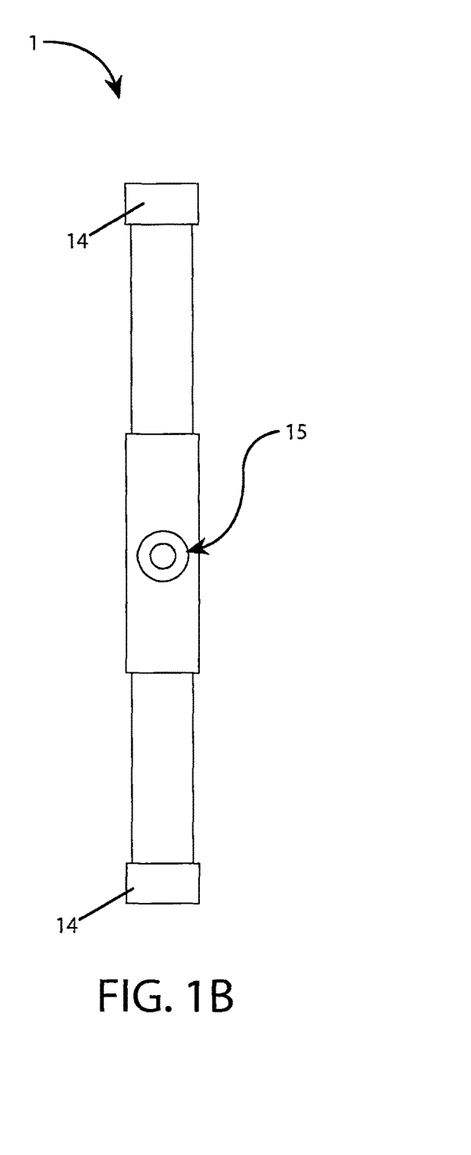
FIG. 1B. Embodiment of an identification device in an open configuration.
Figure 3:
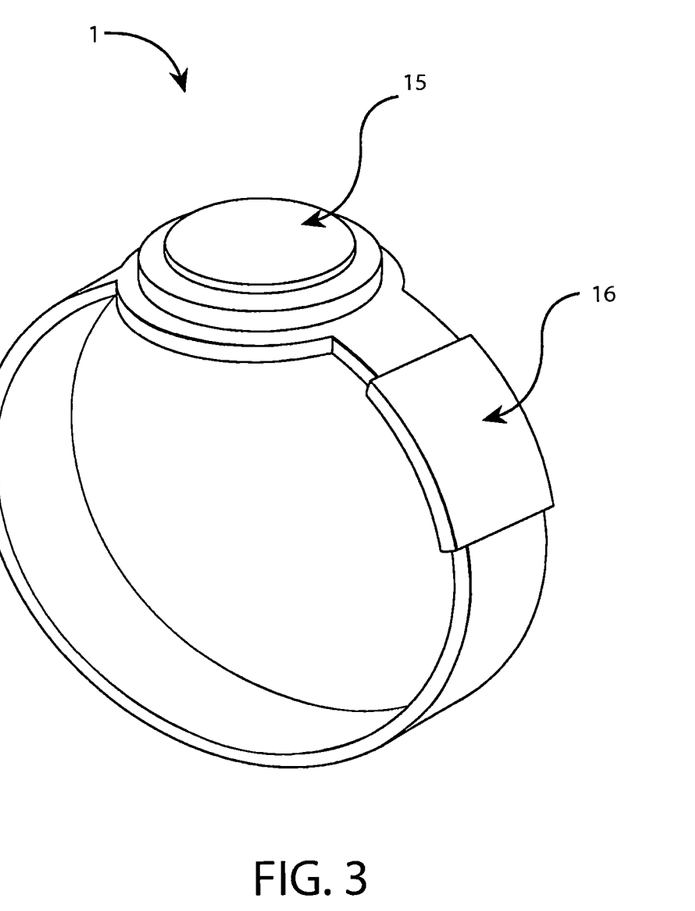
FIG. 3. An embodiment of an identification device.
Figure 5A:
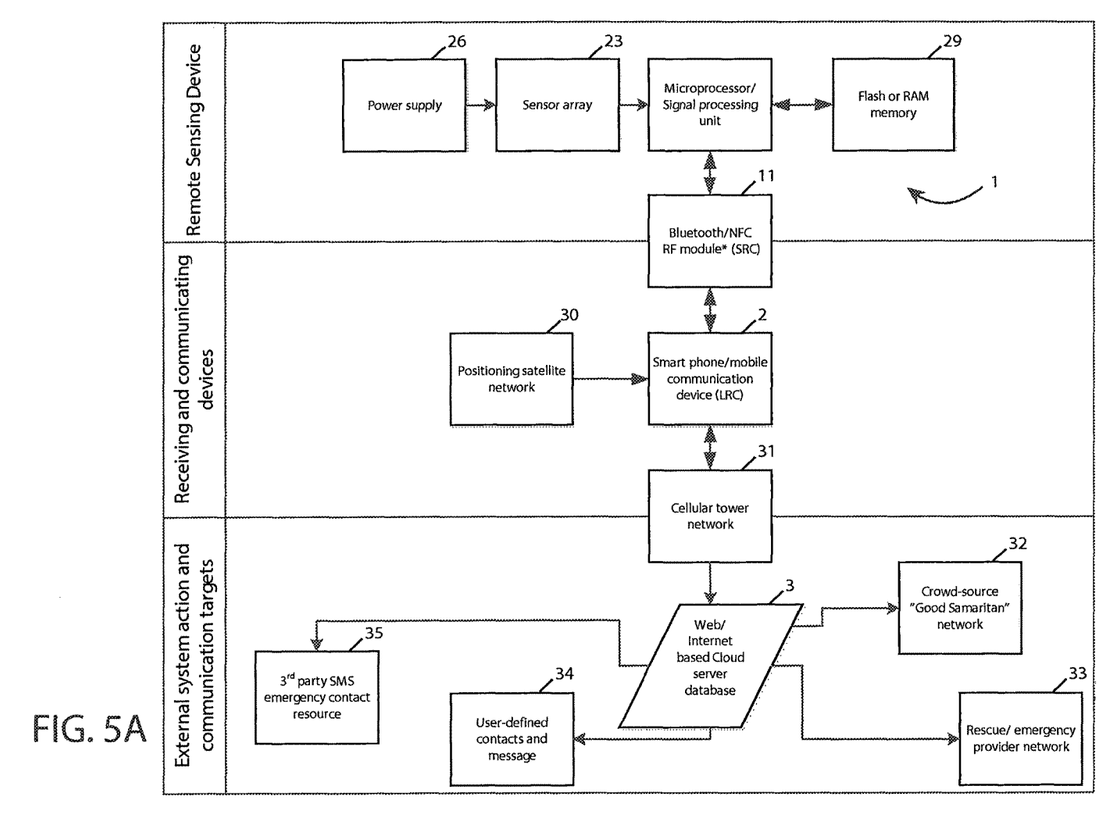
FIG. 5A. Flowchart of communicative steps taken in association with storage of and access to data in an embodiment of a system.
Figure 5B:
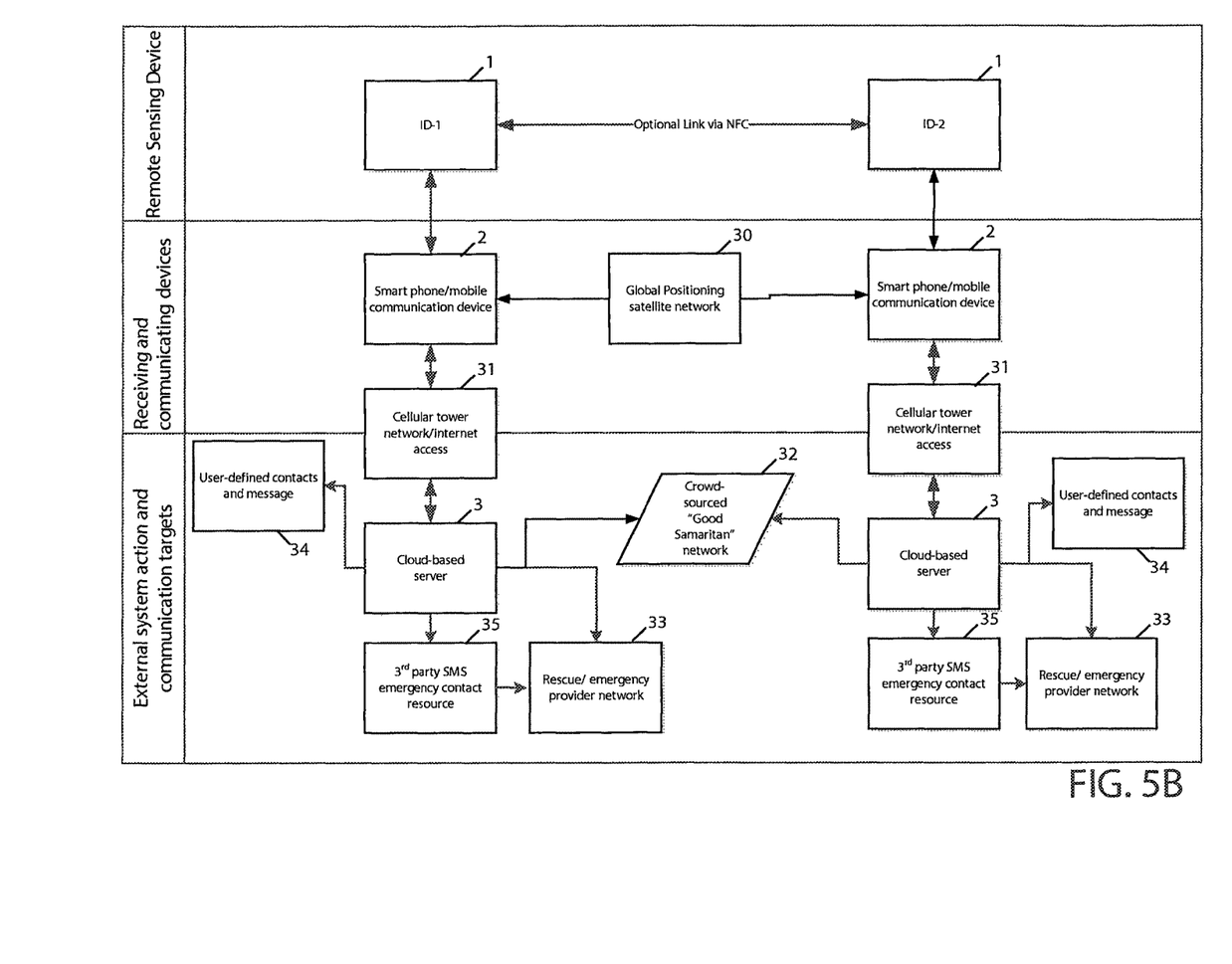
FIG. 5B. Flowchart of communicative steps taken in a system, between two identification devices, in an embodiment.
Figure 5C:
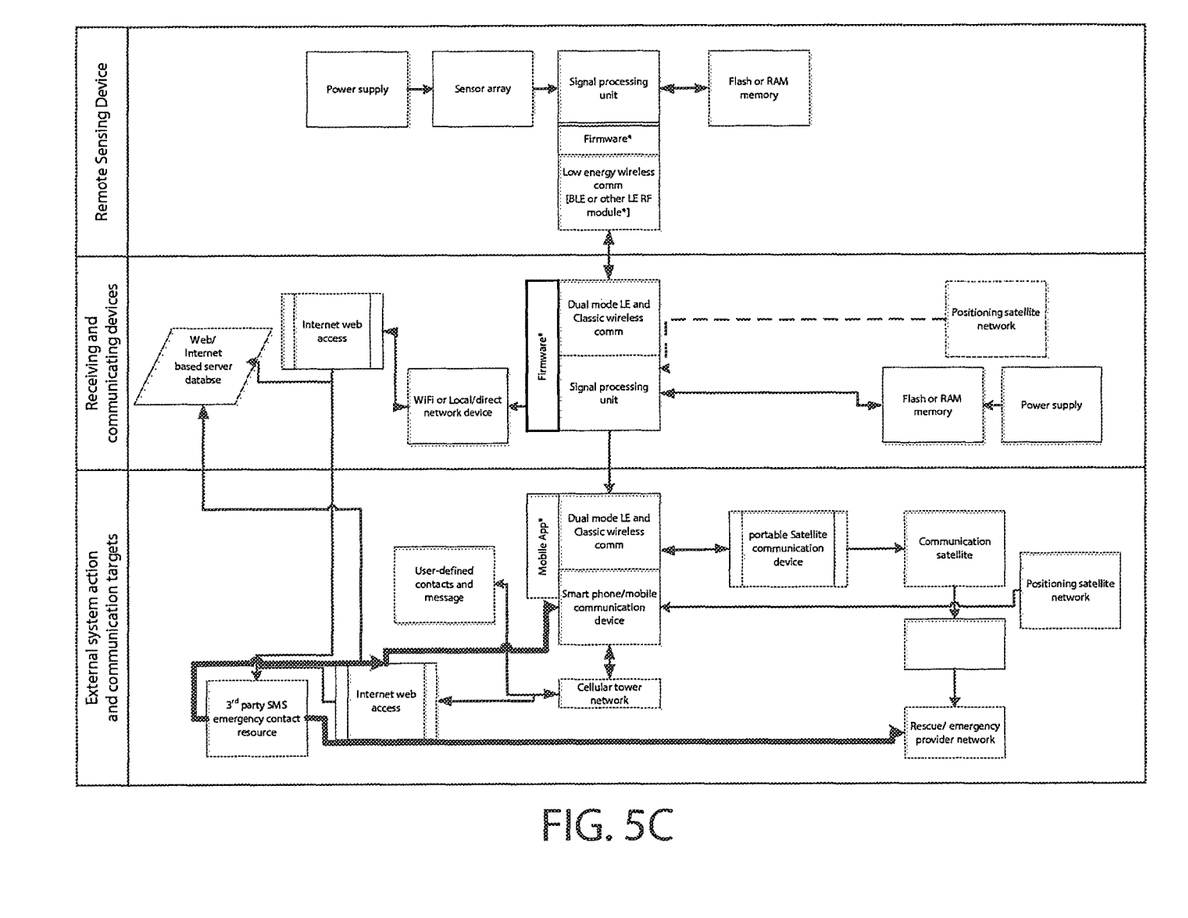
FIG. 5C. Flowchart of communicative steps taken in association with delivery of geolocation information to third party in an embodiment of the system.

In certain embodiments, the device incorporates a button 15, shown in FIG. 1A, FIG. 1B, and FIG. 3. Such button 15 allows a user to input information via an input 24, further shown in FIG. 6A. The button is designed for easy access by the wearer or a third party that comes upon the wearer. Upon pressing the button, the communicative processes described further in the flowcharts of FIG. 5A, FIG. 5B, or FIG. 5C are initiated. A primary purpose of the button is to provide a one step process, namely pressing the button, to initiate processes to deliver important data associated with the wearer to concerned parties, including family, friends, monitors and emergency responders. In an embodiment of the invention, the button may include authentication by the user by biometric sensing, such as fingerprint scanning, to authenticate the identity of the individual triggering the device. In an embodiment of the invention, an ID tag 16 is incorporated within the design. The ID tag 16 in varying embodiments incorporates personal data about the user, including "protected health information" as that term is described in the Health Insurance Portability and Accountability Act. In an embodiment, the ID tag 16 is programmable and exchangeable, so that the ID tag 16 may be replaced or reprogrammed with more updated information, to ensure that the information contained within and on the ID tag 16 about the wearer remains up to date. The ID tag 16 may also include human-readable information about the wearer on an exterior portion of an ID 1 as shown in FIG. 3.

Referring to FIG. 5A, in certain embodiments, an ID 1 includes a power supply 26, sensor 23, microprocessor or signal processing unit, an RF transmitter 11, and a flash or RAM memory 29. An ID 1 communicates with another ID 1, as shown in FIG. 5B. Referring to FIG. 5A and FIG. 5B, such ID 1 communicates with an LRC 2, where such LRC 2 also communicates with a positioning satellite network 30 and/or a cellular tower network 31. Such cellular tower network 31 communicates with a cloud 3. Such cloud 3 may further have a number of programs that are executable depending on a use-case scenario, including a crowd-source "good Samaritan" network 32, a rescue/emergency provider network 33, a user-defined contacts and message network 34, and a $3^{rd}$ party SMS emergency contact resource 35.

In one embodiment, the ID paired with an LRC 2 such as a mobile cellular device, is capable of employing the mobile software application in conjunction with mapping and geo-positioning mobile software applications, such as those produced by Google, to select an optimal EMS and transmit the wearer's data along with the event occurrence data directly to the selected EMS. In an embodiment, the ID paired with an LRC can determine the presence of the wearer in a particular area by NFC positioned at an entrance or exit of a specific area or by use of proximity sensing, using Bluetooth low energy proximity sensing (iBeacon™) to identify the proximity of the wearer.

The memory storage 29 of the ID 1 being operationally connected to a signal processing unit for receiving, storing, and transmitting (1) data relevant to the wearer, including but not limited to gender, height, weight, age, medical records and other "Personal Health Information" as that term is defined in the Health Insurance Portability and Accountability Act, (2) sensor data from sensor module, and (3) communication data relating to transmissions and receptions from the LRC.

An embodiment of the invention features sensing modules being configured to be external to the ID 1, where the external configuration features a wearable sensing module communicatively connected to the ID 1. Said connection being a direct contact (wired) or a wireless connection allowing the sensing module is a removable plug-in attachment, attachable to the ID 1, allowing the wearer to attach different types of sensors to the ID 1 depending on the risks associated with the intended activity.

The sensing module 23 further includes one sensor or a plurality of sensors, preferably a two- or three-axis accelerometer configured to detect linear accelerations, motion, position, and impacts sustained by the wearer. Alternatively, the sensor array may further include but is not limited to the following sensors or a combination thereof; MEMS or piezoelectric accelerometers, force or strain gauges or transducers, force sensing textiles, thermocouples, thermistors, pyrometers, electric potential sensors, microphones, silicon piezoresistive pressure sensor, sensors for climatic data, biometric data, and the presence of gas or chemical particle levels of nerve agents, poisonous gasses, bioweapons, oxygen, and a means for detecting and measuring sonic, percussive and or concussive results of explosions.

Additionally, a sensing module 23, shown in FIG. 6A, includes a signal processor or a multiplicity of signal processors interfaced with the sensing elements of the sensing module. Generally, the signal processor, preferably integrated into the ID processing logic, is configured for any number of functions including filtering low frequency signals and analog to digital or digital to analog signal conversion where appropriate.

In an embodiment of the invention, the ID 1, in combination with the sensing module further comprises a central processing unit, data memory buffer, data logger, fixed or removable flash memory unit, configured to receive, process, and record both signals and processed data from sensing module, process said data to determine if a triggering event occurrence has taken place, and if it has, commence an alarm sequence, said alarm sequence being configured to produce audible, visual, and/or tactile alarm utilizing control and interface means of the ID 1, where the wearer would be alerted to the event occurrence by sounding of an alarm, flashing of lights, or the vibration of the ID. Should the wearer fail to cancel the alarm within a predetermined amount of time (in the preferred embodiment, 10 seconds, though the time period may vary in other embodiments), ID 1 would employ the SRC means to transmit the alarm to the LRC means, which would utilize a mobile software application to employ the audible, visual, and/or tactile means of the LRC to alert the wearer to the alarm, and present the wearer with the option of canceling the alarm via the LRC interface means-having the LRC transmit a "cancel alarm" signal to the ID 1.

If the wearer does not cancel the alarm within an additional predetermined period (in the preferred embodiment, 20 seconds, though the time period may vary in other embodiments) utilizing either the ID or the LRC, the ID will transmit a second signal to the LRC, including such information as the wearer's personal information and encrypted medical records data. The LRC will then transmit said signal to either EMS or a Cloud service configured to process said data, determine the type of event occurrence and determine the most appropriate deployment of EMS responders based on the location of the wearer and the event type.

In an embodiment, the ID may be configured to periodically repeat data transmissions until the confirmation of receipt and or user acknowledgment is received from the LRC upon the expiration of a preset maximum alert time or transmittal attempts, or predetermined time for wearer acknowledgment. The ID is configured to attempt transmitting un-encrypted version of the data to any other LRC equipped with software and processing logic to receive data signals emitted from the ID, where such secondary LRC devices would both alert their users of the event occurrence and automatically pass the alert to the emergency responders, effectively commandeering the secondary LRC to transmit an emergency alarm to the emergency responders. Optionally, the Cloud would store either a duplicate or additional records corresponding to a wearer, providing backup storage and having ability to ensure that the files transmitted to EMS are not incomplete due to some error in the operation of the ID. In this embodiment, the ID would periodically employ the LRC to synch the files stored on the ID with the files stored on the Cloud service.

In an embodiment, the ID is configured to receive a data transmission prompt from the LRC device via the RF receiver. Such a prompt would be transmitted from a paired LRC device, conveying predetermined user confirmation and authorization for the ID to transmit data stored on the removable storage memory to the prompting LRC device via the RF transmitter.

An embodiment features a means for determining the geographic position of the wearer and the ID via either a geopositional detector as a part of the sensing module 23, or by employing a geopositional means integral to the LRC 2, where the ID communicatively paired with a RF capable global positioning system ("GPS"), periodically updates the wearer's data with the location and the time of the update by sending an inquiry to the GPS device and receiving the location data. Alternatively, the LRC 2 is configured with a software application that attaches the geopositional data from a LRC integral GPS to any message sent to EMS.

In certain embodiments comprising a wearable device the connection between a wearable device and a second wearable device, or linking, is done through communication protocols such as nearfield technology. In such cases, the proximity of one device to another nearfield enabled device permits the communication between the two devices. In such embodiments the activation of linking between two such devices may be activated by proximity sensing through nearfield communication or may be activated through the actuation of a button on the first and/or the second device.

In an embodiment, the ID 1 additionally includes a RF transmitter, or transceiver communicatively interfaced with the processing unit, data memory buffer, data logger, and the flash memory unit to allow for transmission of the stored wearer's data and the collected event occurrence data to a receiving device, a long-range communications device 2. Furthermore, said RF transceiver allows the receipt of commands, requests for data transmission, and confirmation signals from the LRC device 2 for the data transmission from ID's SRC means to the long-range communications means LRC 2. Said SRC and LRC 2 means may be employed to upload wearer's data or files to ID 1 or to access and download said data to the computing device comprising the LRC 2.

In an embodiment, the ID 1 is configured with software and processing logic configured to (1) utilize the RF transceiver to transmit data relating to event occurrence; (2) utilize the RF transceiver to confirm the receipt of said transmission by the long-range communications device 2 or periodically resend the data either until confirmation is received or for a preset period of time; (3) if there is no confirmation within the preset period of time, re-encode the transmission of the event occurrence for an immediate alert to emergency responders and attempt a transmission to any long-range communications device in the vicinity of the ID and capable of relying the data to the emergency responders; and (4) utilize the RF transceiver to accept prompts to transmit any data stored within the ID 1 via the RF transmitter and make said data available for access.

In an embodiment, the LRC 2 is configured to receive transmissions in the frequency range of the said RF transmitter 11, and being configured with software and processing logic configured to receive and store the collected event occurrence data and employ any of the LRC user interface functionalities including audible, visual, or tactile to alert the user of an event that exceeds a preset threshold or triggering event.

In an embodiment, the LRC 2 is configured with software and processing logic to require user input to acknowledge the receipt of the said alert/alarm (optionally trigger a direct means to summon EMS); and further being configured with software and processing logic to alert emergency responders and summon assistance if the user fails to acknowledge the receipt of the said alert.

In an embodiment, the LRC 2 is configured with software and processing logic to allow the user review of stored data utilizing said user interface functionalities, specifically visual display capabilities and designate any of the data for transmission or download to a remote computer or network storage device. Such configuration enables the user to transmit data via the LRC to a cloud computer server where the data is analyzed with predetermined algorithms and analytics to provide relevant, actionable and decision supporting data in form easily viewed by the user or other involved personnel interacting with the user. Such generated information from raw data streams from information sets may be viewed with a computing device, smart phone or even via the ID in simplified yet informative form.

An embodiment is configured with a means for programming, storing, and transmittal/reporting of (emergency) information of a person 1000 or object. A wearable ID 1 is configured for detection of an event or a physical triggering event (e.g. wearer appropriate button on the ID) and locally signaling an alarm to the wearer's LRC such as a cellular phone 2 (or nearby cell phone) via the SRC module. If a wearer 1000 fails to respond to the alarm via a control or interface means such as the LRC or appropriate button on the ID to either cancel the alarm or request the transmission of the alarm, the transmission is executed via the SRC module to an LRC 2, configured to transmit the alarm to a remote information and communications center 3 and/or an emergency response means including but not limited to emergency medical services, police and/or fire department.

An embodiment comprises a personal and emergency identification device, ID 1, comprising of at least one electronic memory storage device, processor, sensor, and wireless transmission module operationally connected to one or more persons or objects and capable of being programmed with identification information of said person or object and reporting said information to an external receiving device. Said ID 1 being capable of producing and transmitting a first set of signals, an alarm, comprising information representing properties of said emergency or other designated electronic information.

In an embodiment, the LRC 2 is configured with a processor in signal communication with a memory storage device, which is programmed to capture and record said wearer's information over a wireless or direct connection to a computer or cellular phone and store it on the memory storage device to until a predetermined time such as when the device is powered on (an event occurrence) to produce a second signal to another receiving device 2 of said data representing the personal stored information; the Wearer presses a button on bracelet (ID 1) for a predetermined prolonged period (5 seconds) allowing data to be programmed into the bracelet for storage. Once programmed, the bracelet is in a dormant/sleep mode until the event occurrence, or when the wearer or other person assisting the user presses bracelet activation button which then causes the processor to wake and send the stored personal data via wireless to the wearer's or any other nearby cell phone.

The control means, being configured with the interface means 106, allows for interface between the ID 1 and the user audibly, visually, or tactilely. Said interface means comprising a toggle to power on or off the ID, an audible means to alert the wearer of any number of parameters and events, an event occurrence alarm, a communication transmission or reception, or low power level. Said interface means further comprising a microphone, allowing the wearer audibly communicate instructions to the ID 1, for example requesting the communication to summon EMS assistance.

Said control means being configured and interface means 106 further being configured with a detecting means to detect the integrity of contact between the wearer and ID 1. Such detection means preferably being a pressure sensor or an optical proximity sensor attached to the contact side of the ID 1. Alternatively, said detection means may be configured as another means for detecting human body activity, such as pulse oximetry, near-infrared spectroscopy, electromyography means, echocardiography means, plethysmography means, or electroencephalography. The ID 1 being configured where the lack of integrity of contact between the wearer and ID 1 would cause the ID to go into a "sleep mode" or power down to preserve battery power.

A preferred embodiment of the invention provides that at least in part the data transmission from the ID 1 may be encrypted with 128 WPA by other data encryption means. For example, wearer's name, physical description, and location would not be encrypted and would be available for viewing on the cellular telephone device; however, the wearer's medical records would not, and would only be available for viewing when received by EMS.

A certain embodiment of the invention comprises a method of tracking and communication of the location of an individual comprising the following steps. Attaching a wearable device to a first individual, pairing said wearable device to a mobile communication device. Then sensing, collecting and storing the activity data of said individual and sending of said activity data of said first individual from said wearable device to said mobile communication device, storing of said activity data of said first individual, relaying of said activity data of said first individual to a network cloud server, storing said activity data on said internet cloud server. Then activating a alarm mode on said wearable device, sending notification of alarm mode activation to said mobile communication device, relaying said notification of alarm mode activation to said internet cloud server; said internet cloud server processing said notification of said alarm mode activation, notifying a second individual of said notification of alarm mode activation, sending said second individual said individual's activity data. The individuals contacted may include but are not limited to emergency services, police, fire department or other qualified professionals. The second individuals contacted may be identified based upon relation or proximity to the user. Upon arrival to the location of the user, the second individual may deactivate the alarm mode through the first individual's wearable device or through the use of their wearable device or LRC.

A certain embodiment of the invention comprises the a method for sensing, recording and communicating the activity of a first user, comprising the following steps. Collecting and storing a first set of information pertaining to said first user through a wearable device and then linking said wearable device to a second device associated with a second user. Then sending said first set of information from said wearable device to said second device and collecting a second set of information pertaining to said second user with said wearable device from said second device. Then storing said second set of information from second device on said wearable device and sending said first set of information and said second set of information from said wearable device to a mobile communication device. Then storing said first set of information and said second set of information on said mobile communication device and sending said first set of information and said second set of information to an internet cloud server. Then storing said first set and second set of user information on said internet cloud server and processing said first set and second set of user information on said internet cloud server and creating an association between said first user and said second user, identifying each the first and second user as acquaintances, and providing said association to said first user and said second user for further social interaction.

EXAMPLES

Use Case 1a.

Basic or linking mode: simple data transfer between devices 1 in certain embodiments. The wearer (person 1) wishes to pass their contact information, or pre-stored information directly to a nearby recipient (person 2). The wearer authenticates and places a device 1 into basic mode by depressing a trigger button (equipped with biometric scan, fingerprint, etc). The recipient accepts, and follows a reciprocal procedure of pressing their device's button 15, which places recipient's device 1 into basic or linking mode. The wearer and recipient tap devices to exchange contact or pre-stored information via active NFC. The received contact or pre-stored information is transmitted to each individual's LRC and then transmitted to the internet based cloud storage and stored for later use. In the internet based cloud storage, associations are created such that the linking with one individual may create additional associations, particularly in a social environment wherein a group of people partake in a social and/or networking activity including but not limited to a group event such as a social running club, dating event happy hour.

In certain embodiments of the system, associations are made available to those who directly linked their wearable devices. Alternatively, associations may be made to create group associations wherein information of all individuals involved are made available to all participating with a given group or function. Further still, associations may be made by degrees of separation wherein the association of two non-interacting users sharing a common association may have access to each other's information for further social connection and interaction.

Some embodiments of the system and/or apparatus may employ the BT4.0 protocol as an alternate means of transferring the stored information between devices using the standard 'pairing', connection of the devices, and data transfer protocol as is known in the art.

Use Case 1b:

Disaster triage/location and processing, such as a rescue/emergency provider network 33. Exemplary diagram shown in FIG. 7A.

Figure 7A:
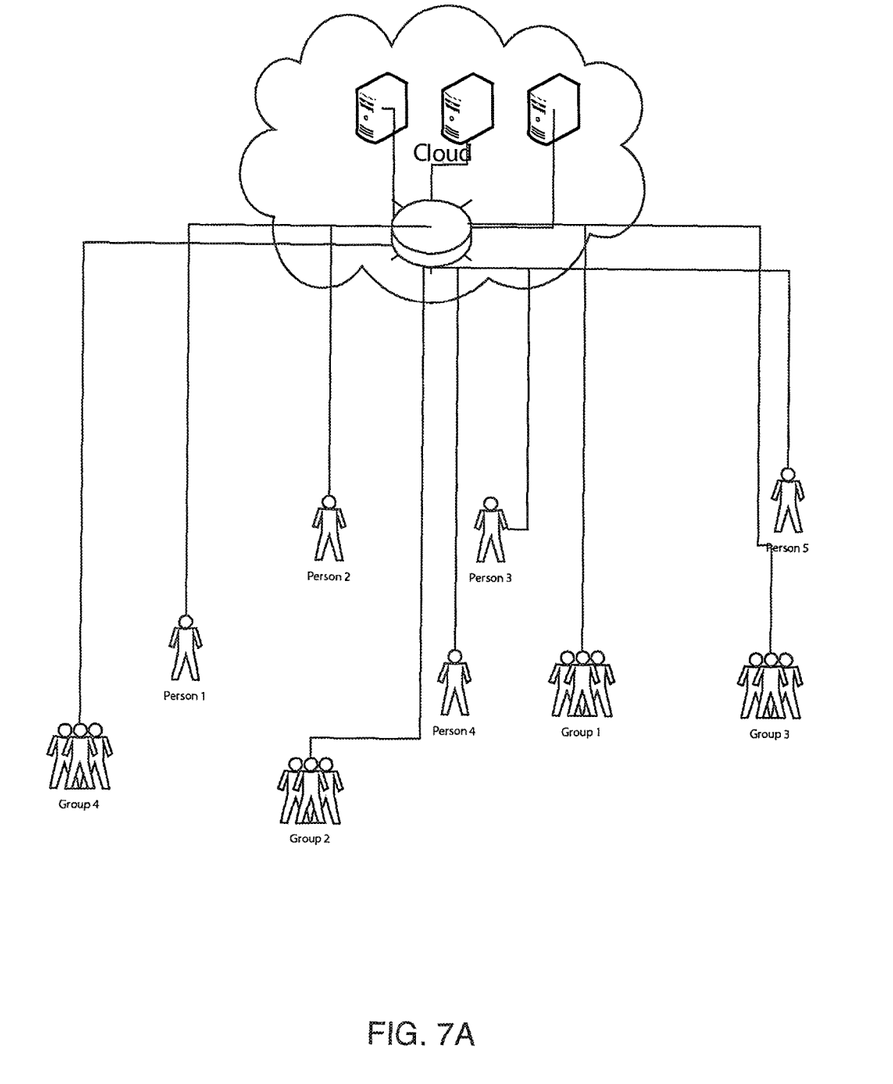
FIG. 7A. Diagram of an embodiment showing connectivity of users in a triage scenario.

Tracking, monitoring, and recovery of persons and property during or just after disasters is challenging due to the nature and chaos of the emergency, coordination of the emergency response and translocation/displacement of victims, emergency personnel, facilities and services. In certain examples, such as triaging patients, disaster victims/subjects enter staging area for emergency relief/treatment/processing. Subjects are given devices 1—color-coded to initial health and/or location status. Wristbands 1 may be non-removable to avoid sharing between individuals. Subjects and associated wristbands 1 are initially registered as being present at a specific location by tapping such wristbands 1 with a receiving NFC reader/writer to exchange wristband ID and time stamp (Date; time) via active NFC that is under the control of emergency responder personnel. The subject may further authenticate ID and location/health status, add pertinent health and contact information to the wristband by emergency personnel at subsequent stages of the emergency response facility, or other facilities using BT4.0 file transfer protocols. Such information transferred to the wristband may include medical information, treatment information, identification information, emergency contacts, as well as time stamp and location information from each registration of the wristband's NFC ID tag. The subject or emergency personnel can access the stored information for tracking, treatment, or other purposes at subsequent periods or times to enable subject location tracking, seek appropriate medical treatment, record medical intervention (and by whom), and aid in recovery of displaced individuals/property.

Use Case 2a:

Individual activity/'Watch me' mode: Individual tracking such as user-defined contacts and message 34, emergency provider network 33, and crowd sourcing safety function network 32. The wearer wishes to perform an activity and allow themselves to be tracked and or enable an emergency notification to be delivered as a user-activated function of the wristband. The wearer opens the mobile phone app on their phone or mobile communication device (LRC). The wristband is paired and connected with the mobile phone/LRC via BT4.0. The wearer begins the activity by depressing a button 15 on the wristband 1 which activates the mobile app/LRC to begin the activity, start recording GPS coordinates and monitoring the wristband 1 via BT4.0. In one example, if a wearer enters an area and is concerned about potential threats or risks to themselves or a risk or emergency event occurs, wearer activates a 'alarm button' mode or alarm mode by depressing the wristband button 15 mode according to the product instructions, allowing the device 1 to transmit a repeating 'emergency' signal via BT 4.0 to the LRC which acquires the GPS location in parallel. Upon receiving the emergency signal, the wearer's smartphone app automatically vibrates/rings and initiates a user-defined countdown (e.g. 30 seconds). If a user does not disable the countdown, the LRC transmits the GPS coordinates and User ID to a cloud server database. The cloud server is capable of associating the User ID and notifying pre-defined contacts of the User's GPS coordinates and that an event has taken place. The cloud server may identify other mobile app users within a specified range of the User's GPS coordinates to alert them of an event or emergency at that GPS coordinate ('Crowd-sourcing safety response) such that 'good samaritan's may respond to the event/emergency. Alternatively, or in parallel, the cloud server may identify notify and transmit the User's GPS coordinates to professional monroting or EMS services within a specified range of the User to alert them of an event or emergency such that appropriately co-located EMS services may be dispatched and respond to the event/emergency Use Case 2b:

Group activity mode: Individual/group tracking such as user-defined contacts and message 34, emergency provider network 33, and crowd sourcing safety function network 32. Exemplary diagram shown in FIG. 7B.

Figure 7B:
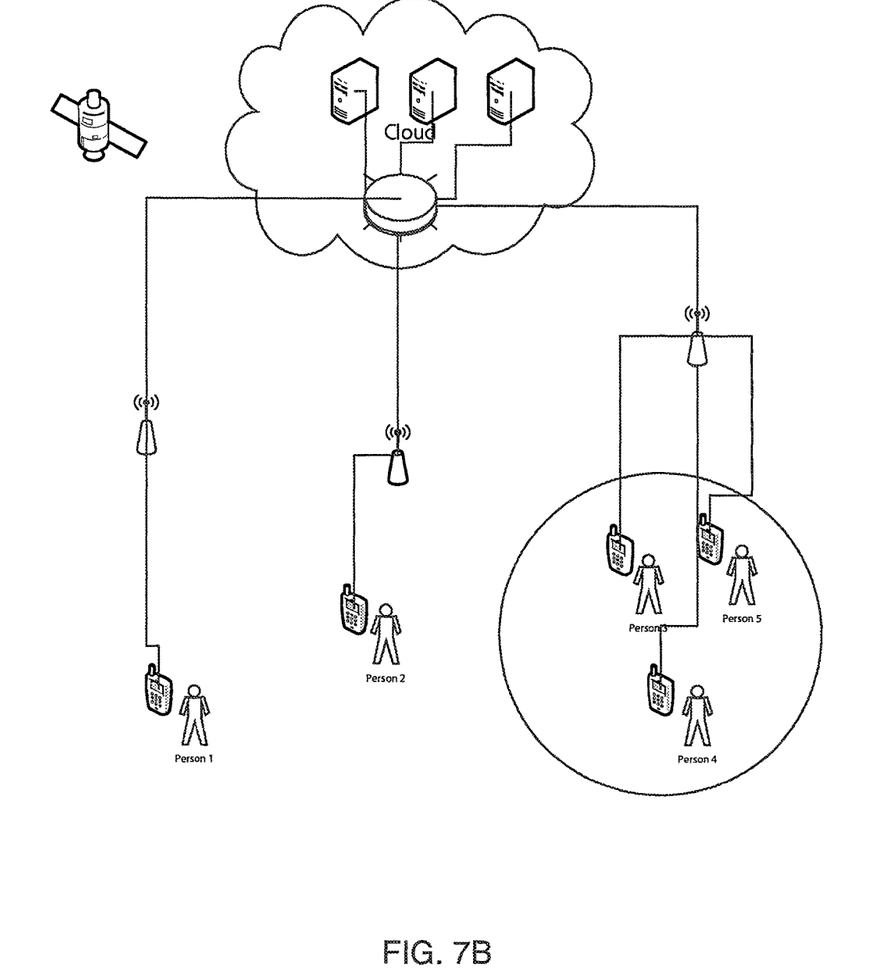
FIG. 7B. Diagram of an embodiment showing connectivity of users in a social mode or alarm mode.

The wearer wishes to perform an activity with a group of others similarly equipped with wristbands and mobile phone app that allows themselves to be tracked and or enable an emergency notification to be delivered as a user-activated function of the wristband. The wearer opens the mobile phone app on their phone (LRC). The wristband is paired and connected with the mobile phone/LRC via BT4.0. The wearer begins the activity by depressing the button 15 on the wristband which activates the mobile app/LRC to begin the activity, start recording GPS coordinates and monitoring the wristband via BT4.0. The wearer 'links' with other group members of the activity by tapping the wristband embodiments 1 together, allowing a transfer of the NFC ID tag from each wristband to be transmitted to the others' wristband and recorded/transmitted to each Users' mobile phone app and recorded. In certain embodiments, linking between wristband 1 embodiments is accomplished by pressing of a button through an input for a designated time period, for example, between 0.5 seconds to three seconds. The group IDs (NFC ID tags) from the activity are transmitted from each user's LRC to the cloud server via GSM/CDMA to create a concatenated Activity Group. Such event associates each user with the group for the activity which allows each user to be tracked/located by other group members using the mobile phone app, GPS, iBeacon, mapping app, and cloud server. Many wristbands may be 'linked' using this procedure.

In the event a group member is separated from the group or enters an area, situation, or is concerned about potential threats or risks to themselves, or a risk or emergency event occurs, the wearer activates the 'alarm button' mode by depressing the wristband button mode according to the product instructions, allowing the device to transmit a repeating 'emergency' signal via BT 4.0 to the LRC which acquires the GPS location in parallel. Upon receiving the emergency signal, the wearer's smartphone app automatically vibrates/rings and initiates a user-defined countdown (e.g. 30 seconds). If the user does not disable the countdown, the LRC transmits the GPS coordinates and User ID to a cloud server database. The cloud server is capable of associating the User ID and notifying pre-defined contacts of the User's GPS coordinates and that an event has taken place. The cloud server also notifies the Activity group members via SMS or other data transmission that an event has occurred with a Group member with the GPS location of that Group member. The group members may then access proximity detection of the Group member in distress using the iBeacon function of BT4.0 enabled phones through the mobile phone app. Additionally, the cloud server may identify other mobile app users within a specified range of the User's GPS coordinates to alert them of an event or emergency at that GPS coordinate ('Crowd-sourcing safety response') such that 'Good Samaritans' may respond to the event/emergency. In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

We claim:

1. A system for sensing, recording and communicating the activity of a user, comprising:
    a wearable device configured to sense, record and transmit information said wearable device further comprising a power supply, a circuit-board, a UHF antenna, a UHF radio, a nearfield radio, a nearfield antenna, an accelerometer and a button;
    a second device comprising a power supply, a circuit-board, a nearfield radio, and a nearfield antenna;
    a mobile communication device, comprising a UHF radio and UHF antenna;
    an internet cloud server, data storage unit and a processing unit;
    said wearable device and said second device in communication through the use of said nearfield antenna and said nearfield radio of said wearable device and said nearfield antenna and said nearfield radio of said second device;
    said wearable device and said mobile communication device in communication through the use of said UHF antenna and said UHF radio of said wearable device and said UHF antenna and said UHF radio of said mobile communication device;
    said wearable device configured to record activities of said user;
    said wearable device configured to communicate activities of said user with said mobile communication device; and
    said mobile communication device configured to communicate said activities with said internet cloud server.

2. The system of claim 1, wherein said second device comprises a second wearable device worn by a second user and said wearable device records information from said second wearable device;
    said wearable device communicates a first set of information to said second wearable device,
    said second wearable device communicates a second set of information to said wearable device,
    and said wearable device communicates said first set of information and said second set of information to said mobile communication device;
    said mobile communication device communicates said first set of information and said second set of information to said internet cloud server creating an association between said wearable device and said second device;
    wherein said first user and said second user can access said first set of information and said second set of information through a device connected to said internet cloud server.

3. The system of claim 2 wherein said first set of information comprises personal information of the user and second set of information comprises the personal information of said second user.

4. The system of claim 3 wherein said personal information of said first user and said second user comprises names, location data and activity data.

5. The system of claim 1 wherein said button allows a user to activate an action selected from the group consisting of a linking mode, a pairing mode and an alarm mode.

6. The system of claim 5 wherein the depression of said button for a predetermined duration activates a specified mode.

7. The system of claim 6 wherein when said button is depressed for more than 3 seconds, said wearable device activates a pairing mode for communication with said mobile communication device.

8. The system of claim 6 wherein when said button is depressed for less than 0.5 seconds, said wearable device activates a linking mode for initiating communication with said second device.

9. The system of claim 6 wherein said button is depressed twice within a duration of less than 0.5 seconds activates an alarm mode.

10. The system of claim 1 wherein said mobile communication device and said second device comprise a single unit;
    said single unit communicates with said wearable device to record, store and communicate user information to said internet cloud server.

11. The system of claim 10 comprising at least two wearable devices wherein said mobile communication device provides interface to associate a wearable device to a user and input personal information of said user.

* * * * *